Aug. 6, 1957            R. L. SMITH            2,801,585

SQUIB

Filed March 25, 1954

INVENTOR.
REX L. SMITH
BY
ATTORNEYS

United States Patent Office 2,801,585
Patented Aug. 6, 1957

2,801,585

SQUIB

Rex L. Smith, China Lake, Calif., assignor to the United States of America as represented by the Secretary of the Navy Application March 25, 1954, Serial No. 418,794

6 Claims. (Cl. 102—28)

(Granted under Title 35, U. S. Code (1952), sec. 266)

The invention described herein may be manufactured and used by or for the Government of the United States of America for governmental purposes without the payment of any royalties thereon or therefor.

This invention relates to squibs for igniting combustible materials, and in particular to an improved squib having substantially no brisance so as to be suitable for use in igniting the propellant grain of a solid propellant rocket motor.

Rocket propelled missiles having solid propellant motors have come into extensive use during the past few years. One of the problems in using such missiles is to prevent the motor from exploding. It has been learned that if the solid propellant becomes shattered when ignited, the burning rate of the propellant will increase rapidly until the pressure within the motor is sufficient to cause the motor to explode. It is necessary, therefore, when igniting the solid propellant grain of a rocket motor to avoid shattering or damaging the grain in any manner.

The most important characteristic of a squib for use in igniting a solid propellant rocket motor is that it has substantially no brisance. In military rocket propelled missiles it is also most desirable that the functioning time, the time between energization and ignition of a squib, be relatively constant over the range of temperature from −65° F. to +165° F., that the reliability of each squib over this temperature range be high, and that the operating characteristics of each squib should change very slowly with time so that each squib will have a relatively long shelf life even when stored at high temperatures and after being immersed in water. Previously used squibs having the desired low brisance required for igniting a solid propellant grain have had extremely variable functioning times over the required temperature range, from 5 to 12 milliseconds, they were unreliable in that there were a large percentage of misfires, and the shelf life under the best storage conditions did not exceed two years. The short shelf life was due, in part, to the fact that such squibs could not be hermetically sealed without raising the brisance of the squib to unacceptable levels.

It is, therefore, an object of this invention to provide an improved squib having little or no brisance and having a relatively constant functioning time over a wide range of temperature.

It is a further object of this invention to provide a hermetically sealed squib having substantially no brisance and having a very high degree of reliability over a wide range of temperature.

It is a further object of this invention to provide a hermetically sealed squib having substantially no brisance and a relatively long shelf life.

It is a still further object of this invention to provide a hermetically sealed squib having substantially no brisance and which may be immersed in water numerous times without adversely affecting its operation.

Other objects and many of the attendant advantages of this invention will be readily appreciated after the same become better understood by reference to the following detailed description when considered in connection with the accompanying drawing wherein.

Figure 1:
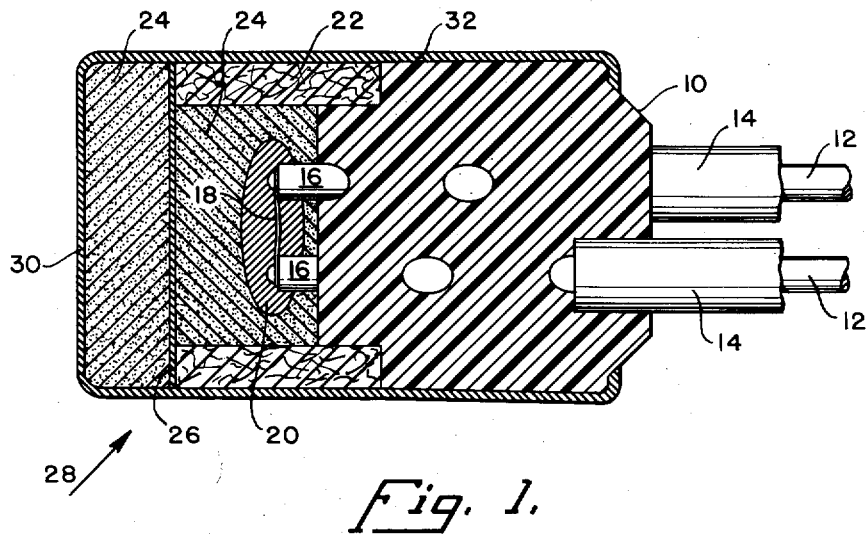
Fig. 1 is a cross section of the squib greatly enlarged.
Figure 2:
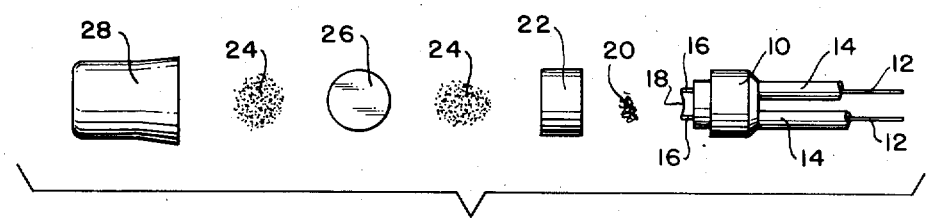
Fig. 2 is an exploded view of the squib.

The improved squib constituting this invention has a plug 10 made of a non-conducting material. A thermosetting plastic such as "Bakelite" is used in the preferred form. Two lead wires 12, which may be made of copper, are formed in plug 10 and extend through it. Portions of the wire 12 leading to plug 10 may be suitably insulated by cloth insulation 14, for example. The inner end portions 16 of lead wires 12 extend a short distance beyond plug 10. A fine bridge wire 18 is secured between the inner end portions 16 of wire 12 by welding or soldering, in a preferred example. Bridge wire 18 is made of a platinum-iridium alloy and has a diameter in a preferred form of .001 inch. The resistance of wire 12 is approximately one ohm. An ignition mixture 20 is placed around wire 18. Mixture 20, in a preferred form, is comprised of 75% by weight of diazodinitrophenol and 25% by weight of potassium chlorate. Mixture 20 is made into a slurry by the addition of a suitable amount of normal butyl acetate to which has been added 2.4% by weight of nitro starch. The slurry is painted on wire 18 and then dried in an oven. Approximately 5 mg. of ignition mixture 20 are applied to wire 18, in a preferred form.

Spacer 22 is mounted on plug 10 and defines a space around ignition mixture 20. Spacer 22 may be made of fiberboard which has been coated by a plastic or by a wax such as paraffin wax. The space around mixture 20 defined by spacer 22 is then filled with a slow burning powder 24 such as black powder having a composition, in a preferred example, of 74% by weight potassium nitrate, 10.4% by weight of sulfur, and 15.6% by weight of charcoal. The amount of powder 24 within spacer 22, in a preferred example, is approximately 40 milligrams. After powder 24 is in place within spacer 22 a single drop of ethyl cellulose is added to the powder. The ethyl cellulose increases the electrical resistance of powder 24 and also acts as an inhibitor, by reducing the burning rate of powder 24. A thin closure disc 26, which is made of aluminum and has a thickness of .001 inch may then be placed over spacer 22 to enclose the space defined by spacer 22 and plug 10. Disc 26 may be omitted if desired.

Approximately 60 milligrams of slow burning powder 24 to which is added a drop of ethyl cellulose are placed within hollow cup shaped case 28. The inner and outer surfaces of case 28 may be coated with shellac to provide high electrical resistance between shunted lead wires 12 and the outer portion of case 28. Case 28, in a preferred example, is made of gilding metal (95/5) copper-zinc alloy. The metal forming the closed end portion 30 is weakened by impacting, drawing, or coining, until its thickness is approximately ¼ to ⅓ the thickness of the side walls 32 of case 28. The preferred form of weakening is by drawing or impacting because no sharp changes in thickness of the metal are produced as is the case when the weakening is accomplished by coining. Case 28 is placed over plug 10 and spacer 22 and crimped onto plug 10 to hermetically seal the squib. In a preferred form the overall length of the squib is approximately .415 inch, the minimum external diameter of the squib is approximately .271 inch, and the thickness of the sidewall 32 is .008 inch.

When current flows through bridge wire 18, the wire becomes heated and ignites ignition mixture 20. Ignition mixture 20 in turn ignites powder 24. The pressure built up by the powder 24 burning within spacer 22 causes disc 26 to rupture so that the powder 24 within case 28 is ignited. The gases from the burning powder rupture the thin wall portion 30 of case 28 permitting flame to be emitted through the end portion 30. The flame from the squib, in one example, ignites an igniter which surrounds the squib and the flame from the igniter then ignites the propellant grain of a rocket motor. If the aluminum disc 26 is omitted then the ignition of the slow burning powder 24 within the space defined by spacer 22 and that within the case 28 takes place almost simultaneously.

The squib constituting this invention has a minimum shelf life of five years. This is primarily due to the fact that it is hermetically sealed within a metal case 28. However, even though the squib is hermetically sealed it has substantially no brisance. Further, the functioning time of the squib is substantially constant, varying from .4 to .8 of a millisecond over the wide range of temperature required, and its reliability over this range of temperature is very high. Because it is hermetically sealed its performance characteristics are not adversely affected by immersion in water.

Obviously many modifications and variations of the present invention are possible in the light of the above teachings. It is therefore to be understood that within the scope of the appended claims the invention may be practiced otherwise than as specifically described.

What is claimed is:

1. A hermetically sealed squib having substantially no brisance comprising a plug made of a thermosetting plastic, two copper lead wires extending through said plug, a platinum-iridium bridge wire connecting said lead wires, an ignition mixture consisting of 75% diazodinitrophenol and 25% potassium chlorate placed about said bridge wires, a spacer member made of fiberboard mounted on said plug, the interior of said spacer defining a space in which are located said bridge wire and said ignition mixture, black powder and an inhibitor substantially filling the remainder of said space, a cup shaped metal case made of gilding metal fitted over said spacer and crimped to said plug, the end of said cup being spaced from said spacer to define a second space, said second space being substantially filled with black powder and an inhibitor, the walls of the end portion of said case being from one third to one fourth the thickness of the side walls of said case.

2. A squib as defined in claim 1 in which black powder is 74% by weight potassium nitrate, 10.4% by weight sulfur and 15.6% by weight charcoal.

3. A hermetically sealed squib as defined in claim 2 in which said inhibitor is ethyl cellulose.

4. A squib as defined in claim 1 in which the resistance of said bridge wire is substantially one ohm.

5. A squib as defined in claim 1 wherein a thin closure disc covers the open end of said spacer to enclose the space defined by said spacer and said plug.

6. In a squib of the type which comprises a cup shaped outer case having a weakened portion, a closure plug hermetically sealing the open end of said case, two lead wires extending through said plug and connected internally of said plug by a bridge wire, an explosive igniting mixture positioned around said bridge wire, and a slow burning powder in said case to be ignited by said igniting mixture upon application of a voltage to said lead wires, the improvement which comprises said slow burning powder surrounding said explosive igniting mixture and substantially filling the remainder of the space in said cup shaped case, said slow burning powder comprising black powder and an inhibitor, whereby said slow burning powder will both suppress the explosive shock wave of said explosive igniting mixture and burn to generate gas, heat, and flame to cause eventual rupture of said case at said weakened portion and emit flame therefrom.

References Cited in the file of this patent

UNITED STATES PATENTS

| | | |
|---|---|---|
| 1,856,431 | Rolland | May 3, 1932 |
| 2,237,932 | Handforth et al. | Apr. 8, 1941 |
| 2,389,086 | Stuart | Nov. 13, 1945 |
| 2,429,490 | Scherrer | Oct. 21, 1947 |
| 2,624,280 | Zebree | Jan. 6, 1953 |

FOREIGN PATENTS

| | | |
|---|---|---|
| 315,186 | Germany | Nov. 1, 1919 |